March 29, 1966  P. T. NELSON ET AL  3,242,808
ATTACH AND EJECTION MECHANISM
Filed May 4, 1964
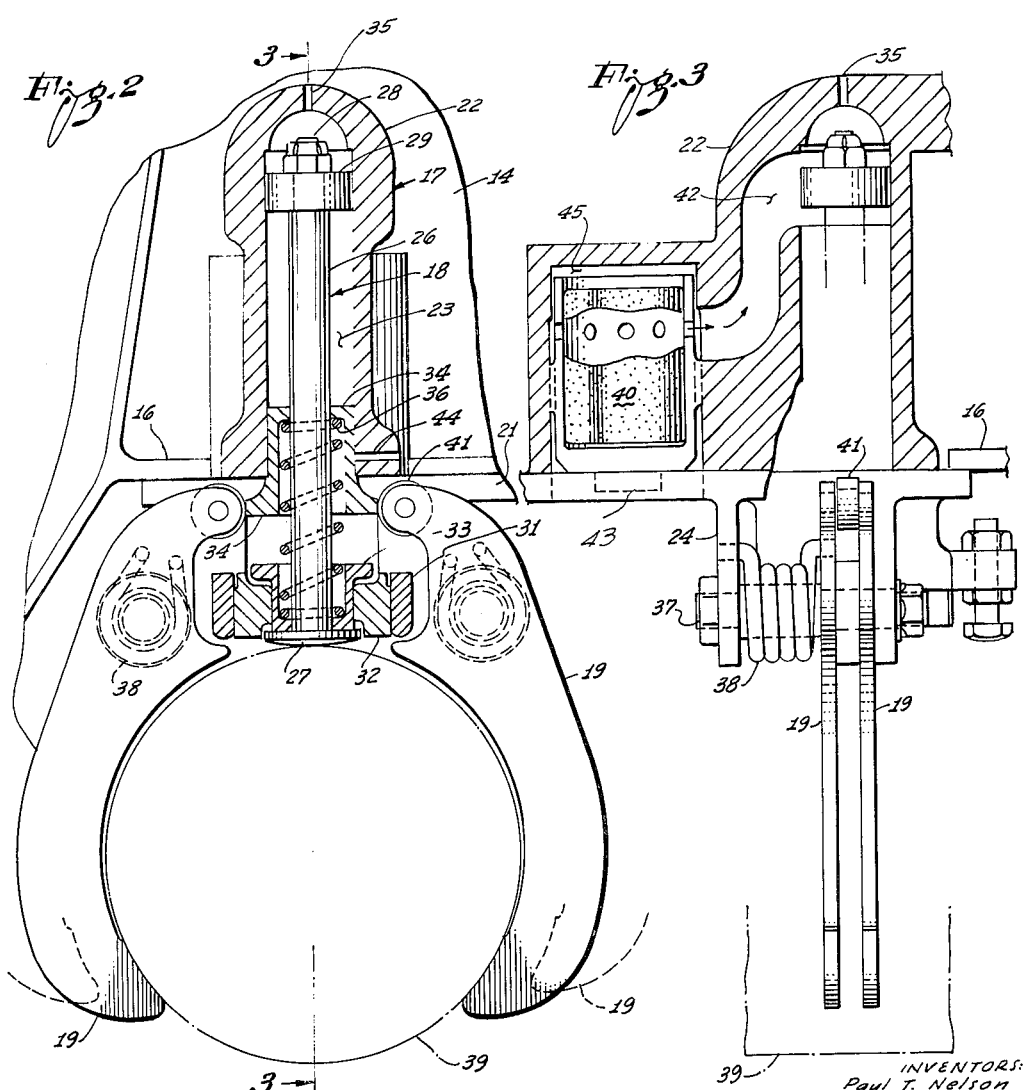
INVENTORS:
Paul T. Nelson
Herbert S. Ripley
John R. Clifton
By Willard M Graham
Agent

United States Patent Office 3,242,808
Patented Mar. 29, 1966

3,242,808
ATTACH AND EJECTION MECHANISM
Paul T. Nelson, Rolling Hills Estates, Herbert S. Ripley, Manhattan Beach, and John R. Clifton, Rolling Hills Estates, Calif., assignors to Northrop Corporation, Beverly Hills, Calif., a corporation of California
Filed May 4, 1964, Ser. No. 364,420
4 Claims. (Cl. 89—1.5)

This invention pertains to dispensing equipment and more particularly to equipment useful in delivering bombs, stores and similar articles.

For purposes of illustration, the dispensing equipment as disclosed herein is shown as being mounted on a nacelle which in turn is mounted on the underside of the wings or fuselage of an aircraft. The nacelle has ordnance equipment mounted therein and bombs are carried by the dispensing equipment, however, the latter may be mounted elsewhere and has other applications.

A principle object of this invention is to provide dispensing equipment adapted to impart a controlled ejection force to articles mounted therein simultaneously with their release thereof.

Another object is to provide dispensing equipment adapted to have articles of various size and shape mounted therein and dispensed therefrom.

Another object is to provide dispensing equipment adapted to impart maximum energy to an article to be dispensed therefrom with minimum peak acceleration.

Another object is to provide dispensing equipment adapted to control the applied ejection force for a specific application without changing the input energy.

Another object is to provide a dispenser which is simple in design yet rugged in construction, economical to manufacture and which may be easily adapted to any purpose for which it is intended.

Although the characteristic features of the present invention are particularly pointed out in the appended claims, the invention itself, also the manner in which it may be carried out, will be better understood by referring to the following description taken in connection with accompanying drawing forming a part of this application and in which:

FIGURE 1 is a fragmentary side elevational view of a nacelle housing ordnance equipment and embodying dispensing equipment as disclosed herein.

FIGURE 2 is an enlarged fragmentary view of the nacelle of FIGURE 1 taken on the line 2—2, specifically this figure shows the construction of the dispensing equipment disclosed herein.

FIGURE 3 is a view of FIGURE 2 taken along the line 3—3 of the latter figure.

Referring to the drawing and particularly to FIGURE 1, here an installation indicated in its entirety by the numeral 11 embodying dispensing equipment 12 of the type disclosed herein is shown. In this installation major components of the dispensing equipment 12 are secured to a flat panel 16 of a nacelle 14 adapted to have ordnance equipment operationally mounted therein. The nacelle 14 in turn is mounted on an aircraft so that the panel 16 normally has a horizontal attitude.

Major components of the dispensing equipment 12 include a housing 17, piston-piston rod combination 18, hereinafter referred to as the rod combination, and a pair of arm members 19. The housing 17 includes a base or attaching portion 21, a portion 22 defining a first cylindrical chamber 23 and depending ear-like portions 24 providing bearing means for the arm members 19. The portion 21 is releasably or permanently secured to the panel 16 by conventional means (not shown), the portion 22 of the housing 17 extends above the panel 16, i.e., as mounted on the panel 16 the portion 22 of the housing 17 extends inside the nacelle 14 and the portions 24 have a depending relation with respect to the panel 16.

The rod combination 18 includes a rod 26 having a poppet-type head 27 and a plane end 28. Fixedly secured to the rod 26, adjacent the plane end thereof, is a piston 29 hereinafter referred to as the primary piston. The rod combination 18 is mounted for reciprocal movement in the chamber 23. An annular depending portion 31 of the housing 17 provides bearing means for the rod 26 at a location spaced from and below the portion 21. The portion 31 carries a ring member 32 allowing linear movement of and providing bearing support for a member 33 having a surrounding relation with respect to the rod 26. The member 33 allows the head 27 to assume various positions (within limits) with respect to the member 32, the purpose of the above mentioned positions will become apparent as the disclosure progresses. A secondary piston 34, shaped substantially as shown in FIGURE 2, has a surrounding relation with respect to rod 26. A helically wound compression spring 36 is positioned and bottomed in aligned counterbores provided in the members 33 and 34 and functions to maintain these members in spaced relation substantially as shown in FIGURE 2.

The arm members 19, generally of accurate configuration, are pivotally mounted on the depending portions 24 of the housing 17 by bolt means 37. Surrounding the bolt means 37 are spirally wound torsion springs 38 the ends of which engage the arm members and portions 24 of the housing 17 in a manner functioning to urge the arm members 19 away from each other at such time as restraining forces as presently described are no longer present. Specifically the springs 38 function to rotate the arm members 19 in opposite directions to a non-restraining position shown by dotted line construction in FIGURE 2. In the non-restraining position of the members 19 they have a spaced relation with respect to a bomb 39 or other article mounted in the dispensing equipment 12.

Rotatably mounted at the upper ends of the arm members 19 (as viewed in FIGURES 2 and 3) are roller members 41 adapted, under certain conditions, to bear on the lower enlarged end of the secondary piston 34. At such time as the rod combination 18 is caused to assume its fully retracted position, the roller members 41 bear on the enlarged lower end of the secondary piston 34 and the arm members 19 are urged to their encircling or restraining position with respect to the bomb 39 (solid line construction in FIGURE 2). The relation and coaction of the members 18, 19, 33, 34, 36, 39 and 41 will be explained further as the disclosure progresses.

The equipment 12 is rendered operational by pressurized fluid originating in any manner, in the present embodiment pressurized fluid is provided by an explosive charge 40 stored and detonated in a chamber provided in the housing 17.

Specifically, explosive charge 40 adapted to be detonated by conventional means is housed in a second chamber 45 provided in the portion 22 of the housing 17. The portion 22 also defines a primary passageway 42 extending between the chambers 23 and 45 and provides fluid communication therebetween. The chamber 45 is rendered fluid tight by a cuplike member 43 which also serves to provide holding means for the charge 40 while the latter is being positioned in the chamber 45. Auxiliary passageways 35 and 44 adapted to relieve fluid pressure in the chamber 23 above and below the piston 29, respectively, are provided in the housing 17 and functions in a manner presently explained. The particular size of passageways 35 and 44 is a contributing factor in controlling and imparting force and energy to the equipment 12. Additional performance control is achieved by varying the size of the chamber 23, components of the rod combination 18, the secondary piston 34, the passageway 42, the chamber 45 and especially the auxiliary passageways 35 and 44.

A brief description of the operation of the dispensing equipment 12 follows, particularly the charging and discharging phases thereof.

The bomb 39—or other article—to be dispensed by the equipment 12 is manually positioned therein. As the bomb 39 is positioned between the arm members 19 its upper surface contacts the head of the rod member 26. Thus the rod-combination 18 is urged to its full retracted position. During the above mentioned movement a force—provided by the spring 36—functions to maintain the members 33 and 34 in spaced relation. Also the spring 36 functions to urge the secondary piston into the chamber 23 and into a bottomed position with respect to the housing 17. As the piston 34 is moved in an upward direction the flaring portion thereof contacts the rollers 41 camming them outwardly with respect to each other, the rollers coming to rest on the enlarged annular portion of the piston 34 as shown in FIGURE 2. At this time it will be seen that the arm members 19 have assumed a partially encircling and restraining relation with respect to the bomb 39 (solid line construction in FIGURE 2).

It will be seen that the spring 36 functions to lower the rod combination 18 with respect to the housing 17 resulting in the head 27 maintain contact with the bomb 39. Accordingly the equipment 12 provides three point contact with the bomb 39 through the range of normal tolerances of the bomb 39.

The bomb 39 being loaded in the manner described above, it may now be ejected at any time desired by detonation of the charge 40. Upon detonation of the charge, pressurized gas is directed through the passage 42 to the chamber 23. In the assembled and fully retracted position of the rod combination 18 it will be seen that the piston 29 is located midway between the upper and lower walls of the passage 42 as the latter enters the chamber 23, accordingly the chamber 23 is pressurized above and below the piston 29.

Pressurized fluid below the piston 29 acts on the secondary piston 34 forcing the latter downwardly thereby removing the restraining force provided by the rollers 41 contacting the enlarged end of the piston 34, this action allows the springs 38 to rotate the arm members outboard with respect to the bomb 39. Simultaneously as the arm members release the bomb 39 the rod combination 18 is urged downwardly. Downward movement of the rod combination 18 is due to the fact that the upper face of the piston 29 presents a greater area to pressurized gas than the lower face. Soon after initial downward movement of the rod combination 18 the flow of pressurized gas to the lower portion of chamber 23 is arrested. Accordingly the downward speed of the rod combination 18 is accelerated providing a positive force acting to effect the ejection of the bomb 39, in other words gravity alone is not relied on to effect ejection of the bomb or other article from the equipment 12.

Pressurized gas entering the lower portion of the chamber 23 is trapped therein upon slight downward movement of the piston 29. This trapped pressurized gas functions to cushion the downward stroke of the rod combination 18. As the aforementioned gas acts on and moves the secondary piston 34 downwardly, the auxiliary passageway 44 is uncovered and the fluid pressure in the lower portion of chamber 23 is relieved. Thus it will be seen that the pressurized gas entering and subsequently trapped in the lower portion of the chamber 23 serves a dual purpose; (1) it functions to move the secondary piston 34 downwardly and (2) it functions to cushion the downward stroke of the rod combination 18. Also the force acting to provide the downward movement of the rod combination 18 may be further controlled by varying the size of the auxiliary passageway 35.

Thus it will be seen that dispensing equipment adapted to restrain, release and provide controlled acceleration of an object positioned therein and also functioning to effect the other objects of the invention as set forth herein is provided.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

We claim:

1. In dispensing equipment including a bomb to be dispensed by the equipment, the combination comprising: a housing defining a first chamber; a pair of opposed arcuate arm members pivotally mounted on said housing for movement between restricting and non-restricting positions in which a bomb is secured therein and released therefrom, respectively; a rod having a head end and a plane end; a primary piston fixedly secured to said rod adjacent the plane end thereof; a secondary piston slideably mounted on said rod at a location between said primary piston and head end and having a terminal position in which the latter is bottomed on said housing; said rod and primary piston being mounted in said first chamber for reciprocal movement therein between retracted and extended positions and being responsive to pressurized fluid; the surface of a bomb contacting the head end of said rod and urging said primary piston and rod to said retracted position at such time as the aforementioned bomb is manually positioned between said arm members; camming means on said secondary piston acting to move said arm members to the restricting position thereof in which the aforementioned bomb is retained therein; said housing defining a second chamber in which pressurized fluid may be generated and a primary passageway providing fluid communication between said first and second chambers; said primary and secondary pistons being responsive to pressurized fluid in said first chamber whereby linear movement, relative to said rod, is imparted to said secondary piston allowing said arm members to assume their said non-restraining position and to actuate said rod from said retracted to said extended position; and spring means positioned between the head end of said rod and said secondary piston functioning to maintain said head end in continuous contact with said bomb.

2. In dispensing equipment as set forth in Claim 1: in which said primary piston when in said retracted position is located between the upper and lower walls defining the opening of said passageway in said first chamber.

3. In dispensing equipment as set forth in claim 2: in which said housing defines first and second auxiliary passageways providing fluid communication between said first chamber and ambient atmosphere; said first and second auxiliary passageways being located on opposite sides of said primary piston, respectively.

4. In dispensing equipment as set forth in claim 3: in which said first auxiliary passageway is continuously open and said second auxiliary passageway provides fluid flow therethrough only after predetermined movement of said secondary piston from the bottomed position thereof.

References Cited by the Examiner

UNITED STATES PATENTS

| | | | |
|---|---|---|---|
| 2,466,980 | 4/1949 | Bronson | 89—1.5 |
| 2,789,468 | 4/1957 | Burns | 89—1.5 |
| 2,826,120 | 3/1958 | Lang et al. | 89—1.7 |
| 2,877,688 | 3/1959 | Markil | 89—1.5 |
| 2,896,509 | 7/1959 | Musgrave | 89—1.5 |
| 2,925,754 | 2/1960 | Fillman | 89—1.5 |
| 3,037,805 | 6/1962 | Geffner et al. | 89—1.5 X |

BENJAMIN A. BORCHELT, *Primary Examiner.*

SAMUEL W. ENGLE, *Assistant Examiner.*